US012577919B2

(12) United States Patent
Sinisi et al.

(10) Patent No.: US 12,577,919 B2
(45) Date of Patent: Mar. 17, 2026

(54) METHODS AND SYSTEM FOR INHIBITING ENGINE SHUTDOWN

(71) Applicant: Ford Global Technologies, LLC, Dearborn, MI (US)

(72) Inventors: Zachary John Sinisi, Royal Oak, MI (US); Andrew E. Burt, Royal Oak, MI (US); Kenneth Leisenring, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 18/486,745

(22) Filed: Oct. 13, 2023

(65) Prior Publication Data

US 2025/0122845 A1 Apr. 17, 2025

(51) Int. Cl.
*F02D 41/02* (2006.01)

(52) U.S. Cl.
CPC .... *F02D 41/0215* (2013.01); *F02D 2200/501* (2013.01)

(58) Field of Classification Search
CPC .................................................. F04D 41/0215
See application file for complete search history.

(56) References Cited

U.S. PATENT DOCUMENTS 7,083,020 B2 * 8/2006 Morimoto ........... F02N 11/0822 180/65.26
8,702,562 B2 4/2014 Zhang et al.
8,935,075 B2 1/2015 Otanez et al.
9,415,773 B2 8/2016 Johri et al.
9,475,487 B2 10/2016 Soo et al.
9,604,635 B1 3/2017 Johri et al.
2002/0074173 A1 * 6/2002 Morimoto .............. B60K 6/485 903/917
2004/0029677 A1 * 2/2004 Mori ................... F16H 61/0031 477/3
2004/0159479 A1 * 8/2004 Morimoto .............. B60K 6/485 180/65.26
2015/0019079 A1 * 1/2015 Romanato ............. B60W 10/20 701/41
2016/0052510 A1 * 2/2016 Aldrich, III .... B60W 30/18063 180/65.265
2016/0194007 A1 * 7/2016 Furuya ............. B60W 50/0097 477/166
2016/0281669 A1 * 9/2016 Rychlinski .......... F02N 11/0818
2017/0291606 A1 * 10/2017 Yamada .......... B60W 30/18072
2019/0322268 A1 10/2019 Leone et al.
2021/0053551 A1 2/2021 Kava et al.

* cited by examiner

*Primary Examiner* — Long T Tran
(74) *Attorney, Agent, or Firm* — McCoy Russell LLP

(57) ABSTRACT

Systems and methods for inhibiting automatic stopping of an internal combustion engine are described. In one example, inhibiting of automatic engine stopping may be prevented in response to vehicle speed and/or an amount of time since the most recent time inhibiting of automatic engine stopping was permitted. Further, the inhibiting of automatic engine starting may be based on vehicle speed and engine starting when vehicle speed is less than two threshold speeds.

20 Claims, 4 Drawing Sheets

METHODS AND SYSTEM FOR INHIBITING ENGINE SHUTDOWN

FIELD

The present description relates to methods and a system for inhibiting automatic stopping of an engine of a hybrid vehicle.

BACKGROUND AND SUMMARY

An engine of a vehicle may be automatically stopped to increase vehicle fuel economy. The engine may be automatically restarted in response to release of a caliper pedal or a low battery state of charge (SOC). However, if the engine is part of a hybrid vehicle, an electric machine may provide propulsive effort after the caliper pedal is released so that the engine may remain stopped. While automatic engine stopping may provide significant benefits, there may be times when automatic engine stopping and starting may be less desirable. Therefore, it may be useful to provide a way of capturing the benefits of automatic engine stopping and starting while reducing a possibility of experiencing less desirable consequences of automatic engine stopping and starting.

It may be understood that the summary above is provided to introduce in simplified form a selection of concepts that are further described in the detailed description. It is not meant to identify key features of the claimed subject matter, the scope of which is defined specifically by the claims that follow the detailed description. Furthermore, the claimed subject matter is not constrained to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
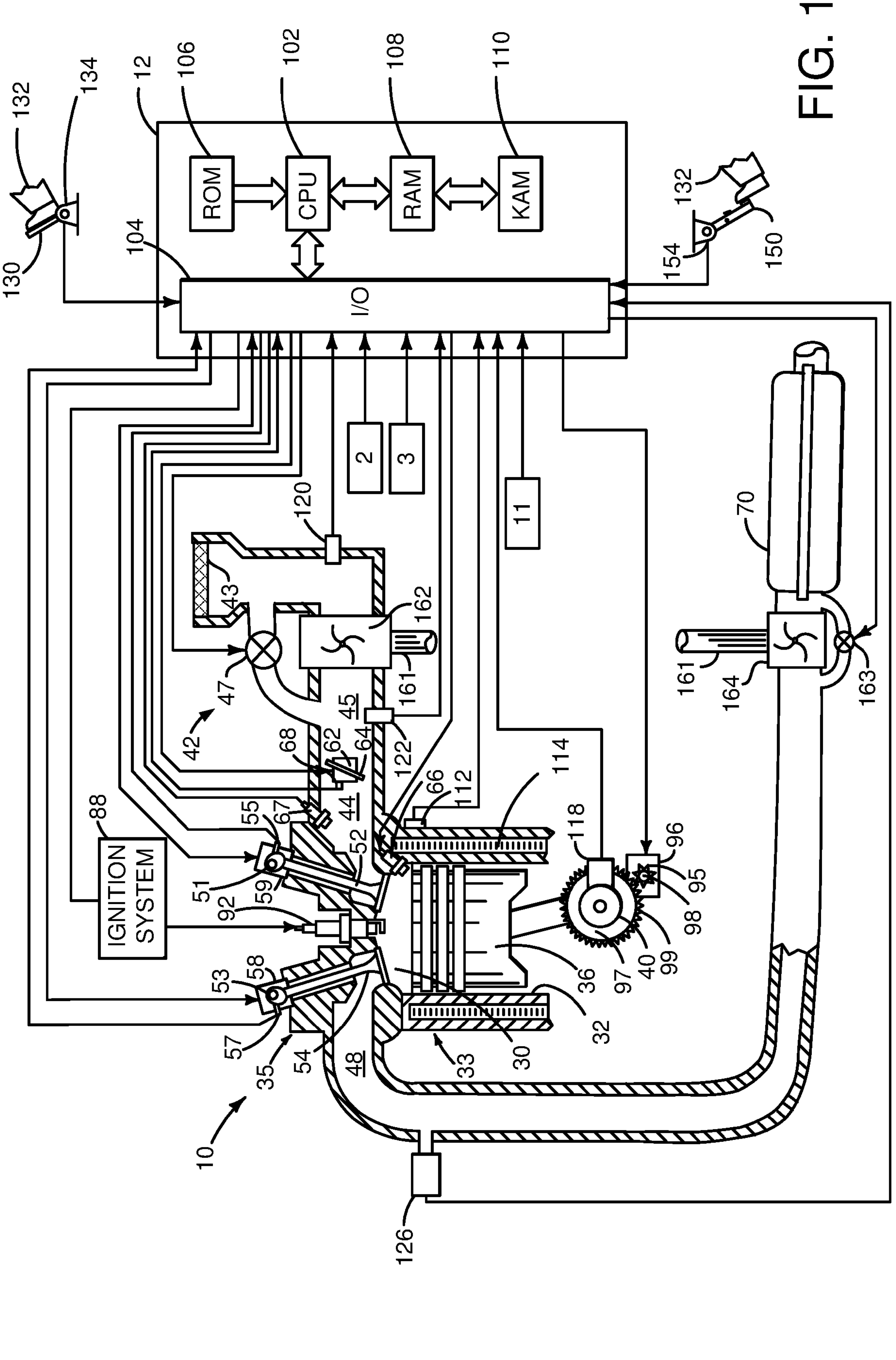
FIG. 1 is a schematic diagram of an engine.
Figure 2:
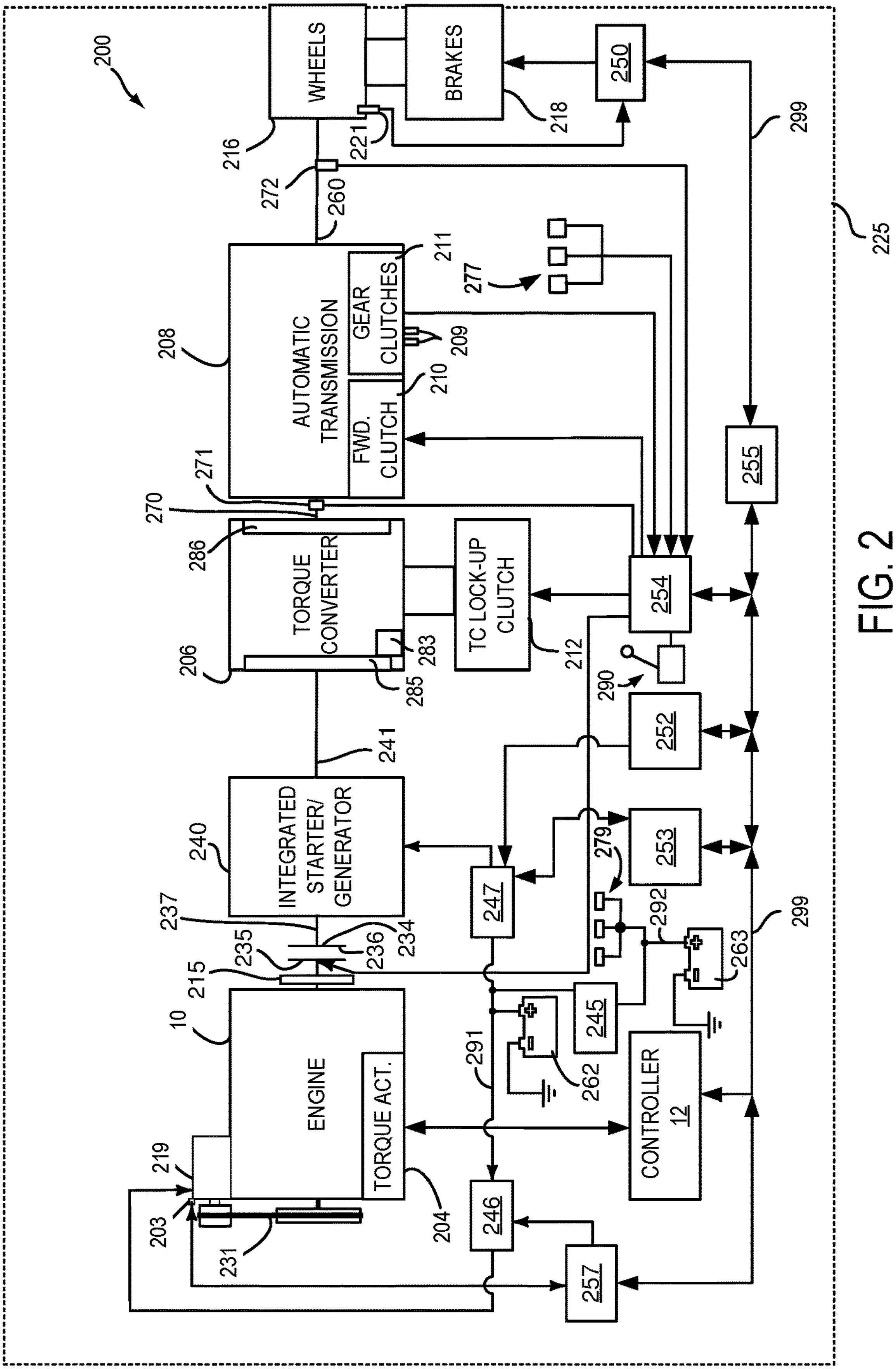
FIG. 2 is a schematic diagram of a vehicle driveline.
Figure 3:
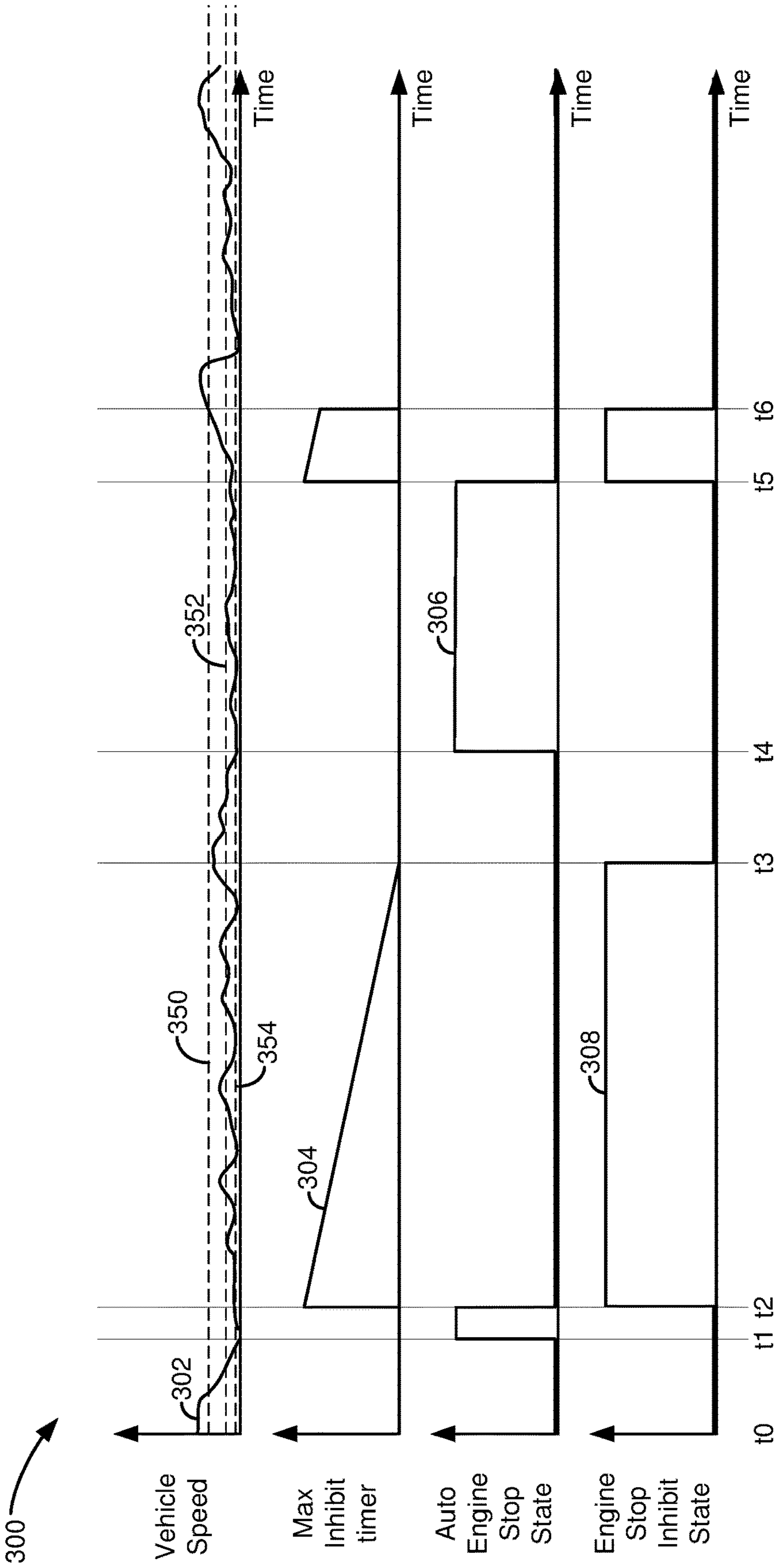
FIG. 3 shows an example engine operating sequence according to the method of FIG. 4.

The present description is related to inhibiting automatic stopping of an internal combustion engine. The inhibiting may be activated in response to select vehicle operating conditions being met. The inhibiting may prevent frequent engine stopping and restarting so that occupants of a vehicle may benefit from being disturbed by frequent engine stopping and starting. As a result, vehicle occupants may find automatic engine stopping and restarting less objectionable. An engine of the type that is shown in FIG. 1 may be part of a hybrid vehicle. The engine may be part of a hybrid vehicle as shown in FIG. 2, or alternatively, in a different hybrid vehicle configuration. Controlling of automatic engine stopping may be performed as shown in FIG. 3. Automatic engine stopping may be controlled according to the method of FIG. 4.

An internal combustion engine of a hybrid vehicle may be automatically stopped and started to conserve fuel and reduce engine emissions. For example, an engine of a hybrid vehicle may be automatically stopped without the hybrid vehicle's operator requesting an engine stop when driver demand is low and when vehicle speed is low. The engine may be automatically started without a hybrid vehicle operator providing input to request an engine start when the driver demand increases. While automatically stopping and starting may have fuel economy and engine emissions benefits, there may be instances when automatic stopping and starting of the engine becomes so frequent and vehicle occupants begin to become disturbed by the frequent engine stopping and starting. Therefore, it may be desirable to provide a way of constraining automatic engine stopping sometimes.

The inventors herein have recognized the above-mentioned issues and have developed a method for inhibiting automatic stopping of an engine, comprising: inhibiting automatic stopping of the engine in response to the engine being automatically started while a speed of a vehicle that includes the engine is less than an exit threshold speed and an entrance threshold speed.

By inhibiting automatic engine stopping according to conditions that the engine was started, it may be possible to provide the technical result of reducing engine stopping and starting busyness so that a greater level of customer satisfaction may be provided. In particular, if the engine is restarted when vehicle speed is low, engine stopping may be inhibited in a way that may reduce a possibility of the engine being subsequently stopped, and restarted shortly thereafter, due to threshold stop/start conditions that work well when vehicle stopping and starting are less frequent but that may cause automatic engine stops and starts that some vehicle occupants may find to be disruptive.

The present description may provide several advantages. In particular, the approach may reduce automatic engine stopping and starting frequency. Further, the approach may raise customer satisfaction of a vehicle. In addition, the approach may reduce wear of devices used to start an engine.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a chain. In addition, starter 96 is in a base state when not engaged to the engine crankshaft 40 and flywheel ring gear 99. Starter 96 may be referred to as a flywheel starter.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into combustion chamber 30, which is known to those skilled in the art as direct injection. Port fuel injector 67 is shown positioned to inject fuel into the intake port of combustion chamber 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position caliper pedal position sensor 154 coupled to caliper pedal 150 (e.g., a human/machine interface) for sensing force applied by human driver 132, a measurement of engine manifold pressure (MAP) from pressure sensor 122 coupled to intake manifold 44; an engine position sensor from an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device. Controller 12 may also receive navigation and GPS data (e.g., locations of lights, signs, roads, etc.) from GPS receiver/navigation system 2. Controller 12 may interface with other vehicles to receive traffic data (e.g., locations of other vehicles, traffic flow, etc.) from connected vehicle interface 3.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The driveline of FIG. 2 includes engine 10 shown in FIG. 1. Driveline 200 is shown including vehicle system controller 255, engine controller 12, first electric machine controller 252, second electric machine controller 257, transmission controller 254, energy storage device controller 253, and caliper controller 250. The controllers may communicate over controller area network (CAN) 299. Each of the controllers may provide information to other controllers such as power output not to exceed thresholds (e.g., power output of the device or component being controlled not to be exceeded), power input thresholds (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded calipers). Further, the vehicle system controller 255 may provide commands to engine controller 12, electric machine controller 252, transmission controller 254, and caliper controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via caliper controller 250. The braking powers may be referred to as negative powers since they slow driveline and wheel rotation. Positive power may maintain or increase speed of the driveline and wheel rotation.

In other examples, the partitioning of controlling driveline devices may be partitioned differently than is shown in FIG. 2. For example, a single controller may take the place of vehicle system controller 255, engine controller 12, first electric machine controller 252, second electric machine controller 257, transmission controller 254, and caliper controller 250. Alternatively, the vehicle system controller 255 and the engine controller 12 may be a single unit while the electric machine controller 252, the transmission controller 254, and the caliper controller 250 are standalone controllers.

In this example, driveline 200 may be powered by engine 10 and ISG 240 (e.g., an electric machine). In other examples, engine 10 may be omitted. Engine 10 may be started with an engine starting system shown in FIG. 1, via integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include an integrated starter/generator (ISG) 219. ISG 219 may be coupled to crankshaft 40 of engine 10 via a continuous loop or chain 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not constrained to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to driveline 200 or to convert driveline power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives driveline 200 or is directly driven by driveline 200. There are no loops, gears, or chains to couple ISG 240 to driveline 200. Rather, ISG 240 rotates at the same rate as driveline 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to driveline 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter bypass lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter bypass lock-up clutch 212 is fully engaged, the engine output power is directly transferred via the torque converter clutch to an input shaft 270 of transmission 208. Alternatively, the torque converter bypass lock-up clutch 212 may be partially engaged, thereby enabling the amount of power directly transferred to the transmission to be adjusted. The transmission controller 254 may be configured to adjust the amount of power transmitted by the torque converter bypass lock-up clutch 212 via adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages torque converter bypass lock-up clutch 212, gear clutches 211, and forward clutch 210. Transmission controller also selectively deactivates or disengages torque converter bypass lock-up clutch 212, gear clutches 211, and forward clutch 210.

A frictional force may be applied to wheels 216 by engaging friction wheel calipers 218. In one example, friction wheel calipers 218 may be engaged in response to a human driver pressing their foot on a caliper pedal (not shown) and/or in response to instructions within caliper controller 250. Further, caliper controller 250 may apply calipers 218 in response to information and/or requests made by vehicle system controller 255. In the same way, a frictional force may be reduced to wheels 216 by disengaging wheel calipers 218 in response to the human driver releasing their foot from a caliper pedal, caliper controller instructions, and/or vehicle system controller instructions and/or information. For example, vehicle calipers may apply a frictional force to wheels 216 via controller 250 as part of an automated engine stopping procedure. A braking torque may be determined as a function of caliper pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power threshold (e.g., a threshold value not to be exceeded), the power is delivered to torque converter 206 which then relays at least a fraction of the requested power to transmission input shaft 270. Transmission controller 254 selectively locks torque converter bypass lock-up clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested driveline wheel power) based on vehicle speed and caliper pedal position. Vehicle system controller 255 then allocates a fraction of the negative desired wheel power to the ISG 240 and the engine 10. Vehicle system controller may also allocate a portion of the requested braking power to friction calipers 218 (e.g., desired friction caliper wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be constrained by transmission controller 254 which outputs a transmission input shaft negative power threshold (e.g., not to be exceeded threshold value). Further, negative power of ISG 240 may be constrained (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG constraints may be allocated to engine 10 and/or friction calipers 218 so that the desired wheel power is provided by a combination of negative power (e.g., power absorbed) via friction calipers 218, engine 10, and ISG 240.

Accordingly, power control of the various driveline components may be supervised by vehicle system controller 255 with local power control for the engine 10, transmission 208, ISG 240, and calipers 218 provided via engine controller 12, electric machine controller 252, transmission controller 254, and caliper controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not constrained to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Caliper controller 250 receives wheel speed information via wheel speed sensor 221 and braking requests from vehicle system controller 255. Caliper controller 250 may also receive caliper pedal position information from caliper pedal position sensor 154 shown in FIG. 1 directly or over CAN 299. Caliper controller 250 may provide braking responsive to a wheel power command from vehicle system controller 255. Caliper controller 250 may also provide anti-lock and vehicle stability braking to control vehicle braking and stability. As such, caliper controller 250 may provide a wheel power threshold (e.g., a threshold negative wheel power not to be exceeded) to the vehicle system controller 255 so that negative ISG power does not cause the wheel power threshold to be exceeded. For example, if controller 250 issues a negative wheel power threshold of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; and a controller including executable instructions stored in non-transitory memory that cause the controller to inhibit automatic stopping of the internal combustion engine and cancel inhibiting automatic stopping of the internal combustion engine in response to a vehicle speed exceeding a threshold speed or a threshold amount of time passing since most recently inhibiting automatic stopping of the internal combustion engine. In a first example, the system further comprises an electric machine selectively coupled to the internal combustion engine. In a second example that may include the first example, the system includes where inhibiting automatic stopping of the internal combustion engine includes preventing automatic ceasing of fuel delivery to the internal combustion engine. In a third example that may include one or both of the first and second examples, the system further comprises additional instructions that cause the controller to inhibit automatic stopping of the internal combustion engine in further response to the internal combustion engine being automatically started. In a fourth example that may include one or more of the first through third examples, the system includes where the threshold amount of time passing since most recently inhibiting automatic stopping of the internal combustion engine is determined via a timer. In a fifth example that may include one or more of the first through fourth examples, the system further comprises additional instructions to adjust a rate of decrementing the timer. In a sixth example that may include one or more of the first through fifth examples, the system includes where the rate of decrementing the timer is based on vehicle speed.

Figure 4:
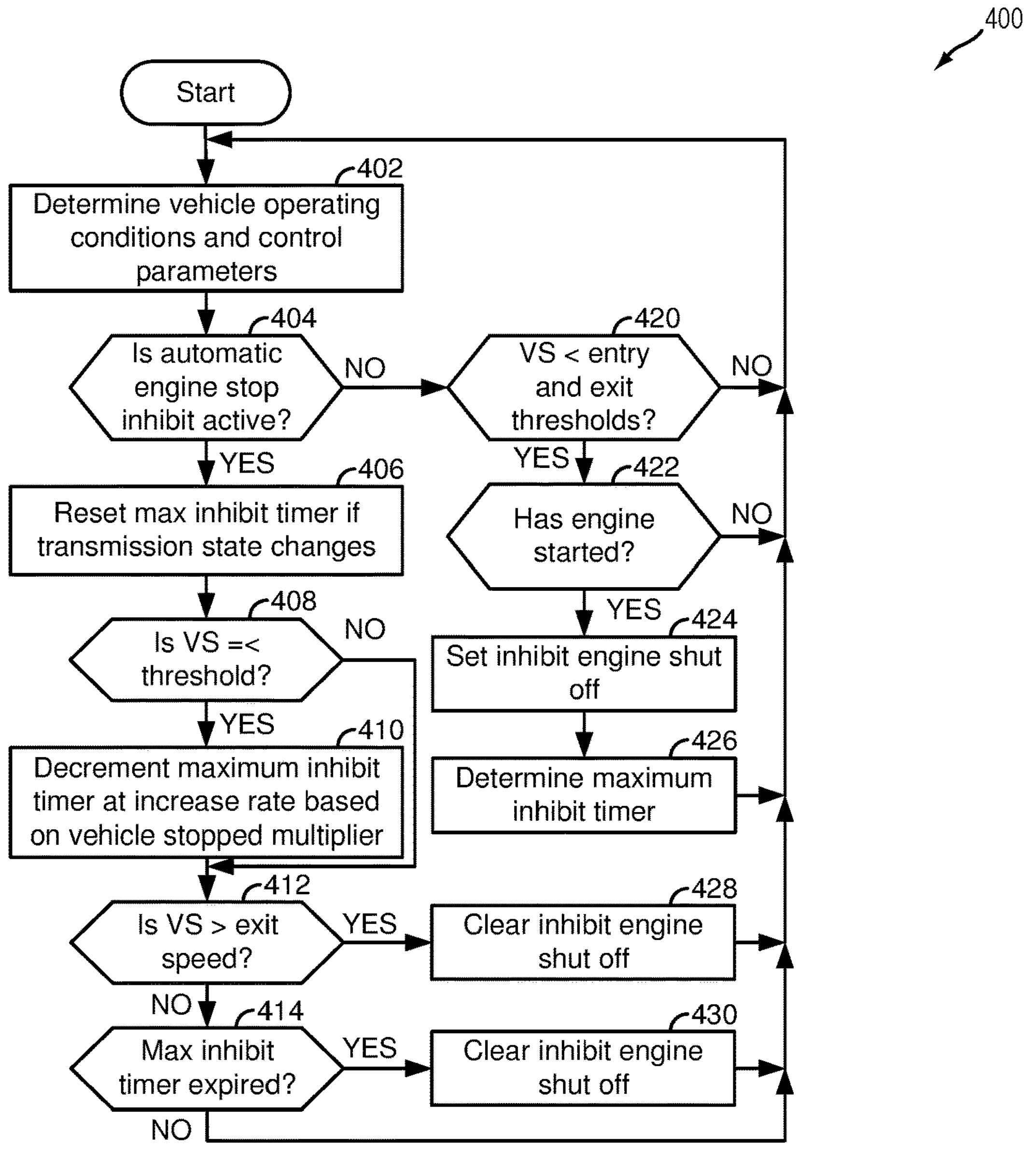
FIG. 4 shows an example method for controlling inhibiting of automatic engine stopping.

Referring now to FIG. 3, a prophetic operating sequence according to the method of FIG. 4 and the system of FIGS. 1 and 2 is shown. The sequence of FIG. 3 may be provided via the system of FIGS. 1 and 2 in cooperation with the method of FIG. 4. The plots of FIG. 3 are time aligned. The vertical lines at times t0-t6 represent times of interest during the sequence.

The first plot from the top of FIG. 3 is a plot of vehicle speed versus time. The vertical axis represents vehicle speed and vehicle speed increases in the direction of the vertical axis arrow. The horizontal axis represents time and time increases from the left side of the figure to the right side of the figure. Solid line 302 represents vehicle speed. Threshold 350 (e.g., dashed horizontal line) represents an exit threshold for ceasing inhibiting automatic engine stopping. In other words, if vehicle speed is above threshold 350, inhibiting of automatic engine stopping may be withdrawn. Threshold 352 (e.g., dashed horizontal line) represents an entry threshold for permitting inhibiting automatic engine stopping. In other words, if vehicle speed is greater than threshold 352, inhibiting of automatic engine stopping may be permitted. Threshold 352 (e.g., dashed horizontal line) represents a stopped vehicle speed threshold. In other words, if vehicle speed is less than threshold 352, the vehicle may be judged to be stopped.

The second plot from the top of FIG. 3 is a plot of a maximum inhibit timer value versus time. The vertical axis represents a value of a maximum inhibit timer and the value of the maximum inhibit timer increases in the direction of the vertical axis arrow. The horizontal axis represents time and time increases from the left side of the figure to the right side of the figure. Solid line 304 represents the value of the maximum inhibit timer. The maximum inhibit timer indicates how long inhibiting of automatic engine stopping may be prevented.

The third plot from the top of FIG. 3 is a plot of automatic engine stop state versus time. The vertical axis represents the automatic engine stop state and the engine is automatically stopped (e.g., ceases rotating and combusting fuel without a specific request of a vehicle operator to stop the engine) when trace 306 is at a higher level that is near the vertical axis arrow. The engine is not automatically stopped when trace 306 is at a lower level near the horizontal axis. Trace 306 represents the automatic engine stop state.

The fourth plot from the top of FIG. 3 is a plot automatic engine stop inhibit state versus time. The vertical axis represents the automatic engine stop inhibit state and the engine is prevented from automatically stopping when trace 308 is at a higher level that is near the vertical axis arrow. The engine is not inhibited from automatically stopping when trace 308 is at a lower level near the horizontal axis. Trace 308 represents the automatic engine stop inhibit state.

At time t0, vehicle speed is greater than threshold 350 and the maximum inhibit timer value is zero. The engine is not automatically stopped and automatic engine stopping is not inhibited.

At time t1, vehicle speed is below threshold 354, so the engine is automatically stopped. The automatic engine stop inhibit is not asserted and the maximum inhibit timer value is zero.

At time t2, vehicle speed is greater than zero, but less than threshold 352. The engine is automatically restarted. The engine may be automatically restarted due to low battery state of charge (SOC) or other vehicle operating conditions. Automatic starting of the engine while vehicle speed is less than threshold 350 and less than threshold 352 causes the engine stop inhibit to activate. The maximum inhibit timer is seeded with a non-zero value. Between time t2 and time t3, the vehicle speed increases and decreases without exceeding threshold 350 while the value of the maximum inhibit timer is decremented toward a value of zero.

At time t3, the value of the maximum inhibit timer reaches zero. Thus, the maximum inhibit timer value has expired (it has been reduced to zero). Therefore, inhibiting of automatic engine stopping is permitted and the engine stop inhibit state is reset back to a value of zero even though vehicle speed has not exceeded threshold 350 since time t2.

At time t4, vehicle speed is reduced to less than threshold 354. This allows the engine to be automatically stopped for a second time. The maximum inhibit timer value is zero and the engine stop inhibit is not activated.

At time t5, vehicle speed is greater than zero, but less than threshold 352. The engine is automatically restarted. Automatic starting of the engine while vehicle speed is less than threshold 350 and less than threshold 352 causes the engine stop inhibit to activate. The maximum inhibit timer is seeded with a non-zero value. Between time t5 and time t6, the vehicle speed gradually increases while the value of the maximum inhibit timer is decremented toward a value of zero.

At time t6, vehicle speed is greater than threshold 350. Therefore, the engine stop inhibit is no longer asserted even though the value of the maximum inhibit timer has not been reduced to zero. However, when the vehicle speed exceeds threshold 350 at time t6, the maximum inhibit timer value is set to zero. The automatic engine stop is not activated.

In this way, inhibiting of automatic engine stopping may be activated and/or deactivated to control a frequency of automatic engine stopping and automatic engine starting (e.g., starting an engine from a non-rotating and non-combusting state without a request of a vehicle operator explicitly requesting an engine start). Clearing of inhibiting of automatic engine stopping may be based on an amount of time passing since a most recent time that inhibiting of automatic engine stopping commenced or vehicle speed exceeding a threshold speed.

Turning now to FIG. 4, a flowchart of a method for inhibiting and clearing inhibiting of automatic engine stops is shown. The method of FIG. 4 may be incorporated into and may cooperate with the system of FIGS. 1-2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions and control parameters. Vehicle operating conditions and control parameters may be determined from the vehicle's various sensors and actuators as well as looking up values in functions or tables of data that are stored in controller memory. The vehicle operating conditions may include, but are not constrained to engine on/off state, vehicle speed thresholds, a vehicle stop timeout multiplier, driver demand torque, transmission operating state (e.g., engaged in drive, engaged in reverse, engaged in neutral, etc.), ambient air temperature, barometric pressure, vehicle position, and battery state of charge. Method 400 proceeds to 404.

At 404, method 400 judges whether or not automatic engine stopping inhibiting is active (e.g., whether or not automatic engine stopping inhibiting (inhibiting stopping of the engine via the controller) is permitted). In one example, method 400 may judge that automatic engine stopping inhibiting is active or inactive according to a value of a variable that is stored in controller memory. If method 400 judges that automatic engine stopping inhibiting is active, the answer is yes and method 400 proceeds to 406. Otherwise, the answer is no and method 400 proceeds to 420.

At 406, method 400 resets a value of a maximum inhibit timer if the operating state of a transmission changes. For example, if the transmission was engaged in reverse and the value of the maximum inhibit timer was 5 seconds before the transmission was shifted to drive, the value of the maximum inhibit timer may be adjusted to 10 seconds in response to the transmission mode change into drive. Method 400 proceed to 408.

At 408, method 400 judges whether or not a present vehicle speed of the vehicle that includes the engine that may be automatically stopped is less than or equal to a stopped vehicle threshold speed (e.g., 0.2 kilometers/hour). If so, the answer is yes and method 400 proceeds to 410. Otherwise, the answer is no and method 400 proceeds to 412.

At 410, method 400 decrements the value of the maximum inhibit timer at an increased rate according to a vehicle stopped multiplier. In one example, vehicle stop multiplier may be determined via the following equation:

$$VSM=f(\text{transmission state})$$

where VSM is a variable that represents the value of the vehicle stop multiplier, f is a function that returns a value of the vehicle stop multiplier, and transmission state is the operating state of the transmission. In one example, the maximum inhibit timer value may be adjusted according to the following equation:

$$MITV(k)=MITV(k-1)-VSM\cdot(dt)$$

where MITV is the maximum inhibit timer value, k is an increment variable, VSM is the vehicle stop multiplier, and dt is the amount of time between executions of method 400. By increasing the decrement rate, automatic engine stopping may be permitted sooner for a vehicle that is stopped as compared to a vehicle that is moving so that fuel economy may be increased during stopped vehicle operating conditions. Method 400 proceeds to 412.

At 412, method 400 judges whether or not present vehicle speed of the vehicle that includes the engine that may be automatically stopped is greater that a threshold vehicle exit speed. In one example, the threshold vehicle exit speed may be 20 kilometer/hour. If method 400 judges that the present vehicle speed is greater than the threshold vehicle exit speed, the answer is yes and method 400 proceeds to 428. Otherwise, the answer is no and method 400 proceeds to 414.

At 428, method 400 clears (e.g., sets to zero) an inhibit engine stop or shut off, thereby allowing the vehicle's engine to be automatically stopped (e.g., cease rotation and combustion via the controller ceasing to deliver spark and/or fuel to the engine without a request to explicitly stop engine rotation by a human vehicle operator). Method 400 returns to 402.

At 414, method 400 judges whether or not a maximum inhibit timer has expired (e.g., the value in the maximum inhibit timer has been reduced to zero). If so, the answer is yes and method 400 proceeds to 430. Otherwise, the answer is no and method 400 returns to 402.

At 430, method 400 clears (e.g., sets to zero) an inhibit engine stop or shut off, thereby allowing the vehicle's engine to be automatically stopped (e.g., cease rotation and combustion via the controller ceasing to deliver spark and/or fuel to the engine without a request to explicitly stop engine rotation by a human vehicle operator). Method 400 returns to 402.

At 420, method 400 judges whether or not the present vehicle speed is less than the threshold vehicle entry speed (e.g., 12 kilometers/hour) and less than the threshold vehicle exit speed (e.g., 20 kilometers/hour). If so, the answer is yes and method 400 proceeds to 422. Otherwise, the answer is no and method 400 returns to 402.

At 422, method 400 judges whether or not the engine of the vehicle has started after the conditions of step 420 have been met. If so, the answer is yes and method 400 proceeds to 424. Otherwise, the answer is no and method 400 returns to 402.

At 424, method 400 activates or sets inhibit automatic engine stopping or shut off so as to inhibit automatic stopping of the vehicle's engine. Inhibiting automatic engine stopping causes the engine to remain on (e.g., rotating and combusting fuel) so that automatic engine stopping and restarting may be temporarily prevented. Method 400 proceeds to 426.

At 426, method 400 determines a value for the maximum inhibit timer. In one example, the maximum value may be determined via the following equation:

$$MINTV=g(Trans\_state)$$

where MINTV is a variable that represents the maximum inhibit timer value, g is a function that returns the maximum inhibit timer value, and Trans_state is a variable that indicates the present operating state of the vehicle's transmission. The function g may index a function or table of empirically determined maximum inhibit timer values. The maximum inhibit timer values may be determined via operating a vehicle and allowing the vehicle's engine to automatically stop and start during different vehicle driving scenarios. Method 400 returns to 402.

The method of FIG. 4 provides for a method for inhibiting automatic stopping of an engine, comprising: inhibiting automatic stopping of the engine in response to the engine being automatically started while a speed of a vehicle that includes the engine is less than an exit threshold speed and an entrance threshold speed. In a first example, the method includes where inhibiting automatic stopping of the engine includes continuing combustion within the engine. In a second example that may include the first example, the method further comprises generating a maximum amount of time that automatic stopping of the engine may be inhibited. In a third example that may include one or both of the first and second examples, the method includes where the maximum amount of time is based on a transmission operating state. In a fourth example that may include one or more of the first through third examples, the method includes where the transmission operating state is a forward or drive mode. In a fifth example that may include one or more of the first through fourth examples, the method includes where the transmission operating state is a reverse mode. In a sixth example that may include one or more of the first through fifth examples, the method further comprises deactivating inhibiting of automatic stopping of the engine in response to the maximum amount of time that automatic stopping of the engine may be inhibited has lapsed since inhibiting automatic stopping of the engine. In a seventh example that may include one or more of the first through sixth examples, the method includes deactivating inhibiting of automatic stopping of the engine in response to a vehicle speed.

The method of FIG. 4 also provides for a method for starting an engine, comprising: cancelling inhibiting automatic stopping of the engine in response to a value of a timer being decremented to a value of zero, where a beginning value of the timer is based on a transmission operating state. In a first example, the method further comprises adjusting a decrementing rate of the timer. In a second example that may include the first example, the method includes where the decrementing rate of the timer is based on a vehicle speed. In a third example that may include one or both of the first and second examples, the method further comprises: before cancelling inhibiting automatic stopping of the engine, inhibiting automatic stopping of the engine in response to the engine starting when a vehicle speed is less than a first threshold and less than a second threshold. In a fourth example that may include one or more of the first through third examples, the method further comprises cancelling inhibiting automatic stopping of the engine in response to vehicle speed exceeding a threshold speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for inhibiting automatic stopping of an engine, comprising:

automatically stopping the engine in response to a vehicle speed decreasing below a lower threshold speed;

subsequent to the step of automating stopping the engine, starting the engine in response one or more vehicle operating conditions and when the vehicle speed is above the lower threshold speed and less than an upper threshold speed; and inhibiting automatic stopping of the engine in response to execution of the step of starting the engine;

where the upper threshold speed is a threshold speed above which automatic stopping of the engine is permitted;

where the lower threshold speed is a threshold speed below which automatic stopping of the engine is permitted; and where the upper threshold speed and the lower threshold speed are constant and non-zero values.

2. The method of claim 1, where the one or more operating conditions include a condition where a battery state of charge (SOC) is less than a threshold value.

3. The method of claim 2, further comprising generating a maximum amount of time that automatic stopping of the engine is inhibited.

4. The method of claim 3, where the maximum amount of time is based on a transmission operating state.

5. The method of claim 4, where the transmission operating state is a forward or drive mode.

6. The method of claim 4, where the transmission operating state is a reverse mode.

7. The method of claim 4, further comprising deactivating inhibiting of automatic stopping of the engine in response to exceeding the maximum amount of time.

8. The method of claim 4, further comprising deactivating inhibiting of automatic stopping of the engine in response to a vehicle speed.

9. A system, comprising:
- an internal combustion engine; and
- a controller including executable instructions stored in non-transitory memory that cause the controller to:
  - automatically stop the engine in response to a vehicle speed decreasing below a lower threshold speed;
  - subsequent to the step of automating stopping the engine, start the engine in response one or more vehicle operating conditions and when the vehicle speed is above the lower threshold speed and less than an upper threshold speed; and
  - inhibit automatic stopping of the internal combustion engine in response to execution of the step of starting the engine;
- where the upper threshold speed is a threshold speed above which automatic stopping of the engine is permitted;
- where the lower threshold speed is a threshold speed below which automatic stopping of the engine is permitted; and
- where the upper threshold speed and the lower threshold speed are constant and non-zero values.

10. The system of claim 9, further comprising an electric machine selectively coupled to the internal combustion engine.

11. The system of claim 9, where inhibiting automatic stopping of the internal combustion engine includes preventing automatic ceasing of fuel delivery to the internal combustion engine.

12. The system of claim 11, further comprising additional instructions that cause the controller to inhibit automatic stopping of the internal combustion engine in further response to the internal combustion engine being automatically started.

13. The system of claim 9, further comprising additional instructions that cause the controller to inhibit automatic stopping of the internal combustion engine in response to a threshold amount of time passing since most recently inhibiting automatic stopping of the internal combustion engine, where the threshold amount of time passing since most recently inhibiting automatic stopping of the internal combustion engine is determined via a timer.

14. The system of claim 13, further comprising additional instructions to adjust a rate of decrementing the timer.

15. The system of claim 14, where the rate of decrementing the timer is based on vehicle speed.

16. A method for starting an engine, comprising:
- automatically stopping the engine in response to a vehicle speed decreasing below a lower threshold speed;
- subsequent to the step of automating stopping the engine, starting the engine in response one or more vehicle operating conditions and when the vehicle speed is above the lower threshold speed and less than an upper threshold speed; and
- inhibiting automatic stopping of the engine in response to execution of the step of starting the engine; and
- where the upper threshold speed is a threshold speed above which automatic stopping of the engine is permitted;
- where the lower threshold speed is a threshold speed below which automatic stopping of the engine is permitted; and
- where the upper threshold speed and the lower threshold speed are constant and non-zero values.

17. The method of claim 16, where the engine is included in a hybrid vehicle.

18. The method of claim 16, further comprising inhibiting automatic stopping of the internal combustion engine in response to a threshold amount of time passing since most recently inhibiting automatic stopping of the internal combustion engine.

19. The method of claim 16, where the decrementing rate of the timer value is based on a vehicle speed.

20. The method of claim 16, further comprising permitting automatic stopping of the engine in response to vehicle speed exceeding the upper threshold speed.

* * * * *